(12) United States Patent
Schoen et al.

(10) Patent No.: US 11,310,608 B2
(45) Date of Patent: Apr. 19, 2022

(54) METHOD FOR TRAINING A LISTENING SITUATION CLASSIFIER FOR A HEARING AID AND HEARING SYSTEM

(71) Applicant: Sivantos Pte. Ltd., Singapore (SG)

(72) Inventors: Sven Schoen, Fuerth (DE); Christoph Kukla, Trabitz (DE); Andreas Bollmann, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/110,509

(22) Filed: Dec. 3, 2020

(65) Prior Publication Data
US 2021/0168535 A1    Jun. 3, 2021

(30) Foreign Application Priority Data
Dec. 3, 2019   (DE) .............................. 102019218808

(51) Int. Cl.
*H04R 25/00* (2006.01)
*G06K 9/62* (2022.01)

(52) U.S. Cl.
CPC ......... *H04R 25/507* (2013.01); *G06K 9/6267* (2013.01)

(58) Field of Classification Search
CPC ............ H04R 2225/39; H04R 2225/41; H04R 2224/55
See application file for complete search history.

(56) References Cited

U.S. PATENT DOCUMENTS

| 6,035,050 A * | 3/2000 | Weinfurtner ......... H04R 25/507 381/313 |
| 6,862,359 B2 * | 3/2005 | Nordqvist ............ H04R 25/505 381/312 |
| 7,319,769 B2 * | 1/2008 | Allegro-Baumann ...................... H04R 25/70 381/312 |
| 7,340,231 B2 * | 3/2008 | Behrens ................. H04R 25/70 381/92 |

(Continued)

FOREIGN PATENT DOCUMENTS

| DE | 102013205357 A1 | 10/2014 |
| DE | 102019203786 A1 | 2/2020 |
| EP | 2255548 B1 | 5/2013 |

OTHER PUBLICATIONS

Barchiesi Daniele et al: "Acoustic Scene Classification: Classifying environments from the sounds they produce" IEEE Signal Processing Magazine, IEEE Service Center, Piscataway, NJ. US, vol. 32, No. 3, May 1, 2015 (May 1, 2015), pp. 16-34, XP011577488, ISSN: 1053-5888, DOI:10.1109/MSP.2014.2326181 [retrieved Apr. 2, 2015].

(Continued)

*Primary Examiner* — Ryan Robinson
(74) *Attorney, Agent, or Firm* — Laurence A. Greenberg; Werner H. Stemer; Ralph E. Locher

(57) ABSTRACT

In a method for the training of a listening situation classifier for a hearing aid, a user is presented with a number of acoustic signals by use of a terminal device, which prompts the user to indicate the signal source of the signal or the particular presented signal. The training data is adapted for the listening situation classifier in dependence on the user's indication of the presented signal or one of the possibly several signals presented and updates the listening situation classifier by use of the training data.

16 Claims, 2 Drawing Sheets

(56) References Cited

U.S. PATENT DOCUMENTS

| | | | | |
|---|---|---|---|---|
| 7,769,702 B2* | 8/2010 | Messmer | H04R 25/507 | |
| | | | 706/16 | |
| 7,889,879 B2* | 2/2011 | Dillon | A61N 1/36038 | |
| | | | 381/314 | |
| 8,139,778 B2* | 3/2012 | Barthel | H04R 25/70 | |
| | | | 381/60 | |
| 8,150,044 B2* | 4/2012 | Goldstein | H04R 1/1083 | |
| | | | 381/57 | |
| 8,477,972 B2* | 7/2013 | Buhmann | H04R 25/70 | |
| | | | 381/312 | |
| 9,031,663 B2* | 5/2015 | Lineaweaver | H04R 25/70 | |
| | | | 607/57 | |
| 9,131,324 B2* | 9/2015 | Goorevich | H04R 25/30 | |
| 9,191,754 B2 | 11/2015 | Barthel et al. | | |
| 10,390,152 B2* | 8/2019 | Ungstrup | H04R 25/505 | |
| 10,536,786 B1* | 1/2020 | Lyon | G10L 15/1807 | |
| 10,560,790 B2* | 2/2020 | Jones | G10L 21/0364 | |
| 10,609,494 B2* | 3/2020 | Hannemann | H04R 25/505 | |
| 2005/0105750 A1* | 5/2005 | Frohlich | H04R 25/507 | |
| | | | 381/314 | |
| 2011/0051963 A1* | 3/2011 | Barthel | H04R 25/70 | |
| | | | 381/314 | |
| 2013/0070928 A1* | 3/2013 | Ellis | H04R 25/30 | |
| | | | 381/56 | |
| 2015/0271607 A1* | 9/2015 | Sabin | H04R 25/30 | |
| | | | 381/314 | |
| 2018/0192208 A1* | 7/2018 | Zhang | H04R 25/305 | |
| 2021/0176572 A1* | 6/2021 | Kuebert | H04R 25/55 | |
| 2021/0211814 A1* | 7/2021 | Tripathi | G06F 3/0488 | |

OTHER PUBLICATIONS

Carola Wagener Kirsten et al et al: "Recording and Classification of the Acoustic Environment of Hearing Aid Users", Journal of the American Academy of Audiology, [Online], vol. 19, No. 04, Apr. 1, 2008 (Apr. 1, 2008), pp. 348-370, XP055795916,CA, ISSN: 1050-0545, DOI: 10.3766jjaaa.19.4.7 URL:https://www.audiology.orgjsitesjdefaul t/filesjjournal/JAAA_19_04_06.pdf> [retrieved Apr. 15, 2021].

* cited by examiner

METHOD FOR TRAINING A LISTENING SITUATION CLASSIFIER FOR A HEARING AID AND HEARING SYSTEM

CROSS-REFERENCE TO RELATED APPLICATION

This application claims the priority, under 35 U.S.C. § 119, of German patent application DE 10 2019 218 808, filed Dec. 3, 2019; the prior application is herewith incorporated by reference in its entirety.

BACKGROUND OF THE INVENTION

Field of the Invention

The invention relates to a method for training a listening situation classifier for a hearing aid. Furthermore, the invention relates to a hearing system which is designed in particular to carry out the aforementioned method.

Hearing aids, especially those in the form of hearing assistance aids, serve for compensating at least in part for the hearing impairment of those who have a hearing impairment. Conventional hearing aids usually have at least one microphone to pick up noises from the environment, as well as a signal processor, which serves for processing the detected noises and amplifying and/or muffling them, especially in dependence on the individual hearing impairment (especially one which is frequency specific). The processed microphone signals are then taken from the signal processor to an output transducer—usually one in the form of a loudspeaker—for auditory output to the person wearing the particular hearing aid. Depending on the type of hearing impairment, so-called bone conduction receivers or cochlear implants are also used for the mechanical or electrical stimulation of the sense of hearing. Yet the term hearing aid also encompasses other devices, such as earphones, so-called tinnitus masks, or headsets.

In particular, hearing assistance aids often have a so-called listening situation classifier (in short: classifier), which serves for identifying the presence of a particular, predefined "listening situation" especially with the help of the noises detected. Such listening situations are usually characterized by a specific signal/noise ratio, the presence of speech, a relatively high tonality, and/or similar factors. The signal processing is then generally altered in dependence on the identified listening situation. For example, a narrow directional effect of a directional microphone is required for a situation in which the hearing aid wearer is speaking to only one person, whereas a unidirectional effect may be advantageous out in the open with no speech present. A speech recognition algorithm is often used in the classifier to identify a speech situation.

Classifiers are furthermore customarily "trained" (or programmed) by means of a database, where known listening examples are stored, such as those for specific listening situations, so that as many possible acoustic situations can be matched up with the correct listening situation during normal operation. Even so, it may happen that a classifier will wrongly match up an acoustic situation (at least subjectively so for the hearing aid wearer) or not even be able to match it up. In this case, a signal processing which is not satisfactory for the hearing aid wearer may result.

SUMMARY OF THE INVENTION

The problem which the invention proposes to solve is to make possible a better coordination of a listening situation with an acoustic situation.

This problem is solved according to the invention by a method with the features of the independent method claim. Moreover, this problem is solved according to the invention by a hearing system with the features of the independent hearing system claim. Advantageous embodiments and further developments of the invention, some of them inventive steps in themselves, are presented in the dependent claims and the following specification.

The method according to the invention serves for the training of a listening situation classifier (in short" "classifier") for a hearing aid, especially a hearing assist aid. According to the method, a user (especially a user of a terminal device) is presented with a number of acoustic signals by means of the terminal device. The user is then prompted to indicate the signal source for the or the respectively presented signal. In particular, in the event that multiple acoustic signals are presented, the user is prompted accordingly to make an indication preferably after each individual presentation before the next presentation occurs. Training data is adapted for the listening situation classifier in dependence on the user's indication of the presented signal or one of the possibly several signals presented and the listening situation classifier is updated by means of the training data (especially the adapted training data).

The hearing system according to the invention is designed to carry out the method as described here and in the following (preferably in automatic manner, i.e., on its own, but also in particular in an interaction with the user). The hearing system contains at least one terminal device of the aforementioned kind, the classifier, which is formed preferably by an algorithm, especially a neural net, a self-learning software or the like, and a controller. The controller serves preferably for carrying out at least parts of the method (such as the adapting of the training data).

Preferably, the user is the user of the hearing aid, also called the hearing aid wearer in the following.

Because a user is involved (at least indirectly) in the training of the classifier, it is possible to make advantageous use of knowledge and experience, potentially going beyond training data for the classifier which is usually found in a training database. Furthermore, it becomes possible to also further improve the classifier continuously, i.e., in particular to keep training it further, so that the results achieved by the classifier can become more accurate.

Hence, the method and the hearing system equally have the same benefits as described here and in the following. Likewise, the method also preferably makes use of the physical features provided by the hearing system and/or other data provided by it.

The terminal device is preferably a mobile device, having an associated processor and also preferably an interface to an (optionally mobile) data network. In one variant, the terminal device is the hearing aid (especially the hearing assist device of the hearing aid wearer), preferably having a wireless interface for connection to an (optionally mobile) data network or at least for connection to an intermediate device which is connected to such a data network, such as a smartphone, a tablet, a smartwatch, a laptop or the like. In one preferred variant, however, the terminal device is one such intermediate device, especially a smartphone, a tablet, or the like. In particular, in the latter case, the user may also be independent of the hearing aid wearer, and thus not even wear any hearing aid, for example. But basically, the user can also be a hearing aid wearer.

The acoustic presentation of the respective signal is done via a loudspeaker or another output transducer of the hearing aid—optionally controlled by the intermediate device forming the terminal device (i.e., by the smartphone, for example)—or by the terminal device itself (i.e., especially by a loudspeaker of the smartphone etc.). In the latter case, the indication is preferably a manual input by the user, e.g., on a touch screen of the smartphone etc. Alternatively, the indication—possibly also in the latter case—is a voice input. In this case, optionally, the terminal device may also be formed by a digital assistant, which is provided and designed for voice commands from the user.

In one preferred variant of the method, the presented signal or one of the possibly several signals presented forms a characteristic signal for an acoustic situation not known to the classifier. In other words, the presented signal (or at least one of possibly several signals) is characteristic of such an unknown acoustic situation. By the term "unknown" is meant in this context and in the following in particular that the classifier cannot match up this acoustic situation with any known, in particular any trained listening situation, or has matched it up with a listening situation which results in an unsatisfactory listening experience on account of the associated signal processing settings for the user or at least for one user (especially for one of optionally multiple hearing aid wearers). In this case, therefore, the indication of the user (thus, optionally, that of the hearing aid wearer) for this characteristic signal of the unknown acoustic situation can be utilized advantageously to adapt the training data for the classifier so that in future the same or preferably also a comparable acoustic situation can be identified or matched up with adequate precision.

In one preferred modification of the above variant of the method, only the user's indication for such a characteristic signal of an unknown acoustic situation is used for adapting the training data. Indications of signals assigned to known signal sources or acoustic situations, on the other hand, are preferably not considered for altering the training data.

In an especially expedient variant of the method, the characteristic signal for the unknown listening situation contains a recording of a real (acoustic) situation. This signal is preferably formed by such a recording. In this way, the classifier can be adapted advantageously to real situations not (yet) modeled or contained in the training data.

In one preferred modification, the above described recording of the real (acoustic) situation is produced when at least one hearing aid wearer provides a characteristic input for a setting produced in unsatisfactory manner by the classifier and/or when the classifier can only match up the real (acoustic) situation with a trained (i.e., a known) listening situation by a probability value less than a limit value. The characteristic input is seen here as being in particular a user changing loudness, for example, or a manual switching of "programs" (i.e., in particular, a switching to signal processing settings associated with a different listening situation), which is done after a change in the signal processing settings (especially one occurring automatically by the hearing aid based on the classification). In addition, such an input can also occur on a remote control for the hearing aid, for example in an associated control application installed for example on a smartphone. In addition or alternatively, the classifier is adapted to create, during the classification, a probability value for the probability with which the current acoustic situation corresponds to a known listening situation. In addition, or again alternatively, the recording of the current acoustic situation may also be started by another (third) person, such as an audiologist or the like, especially by means of a kind of remote access.

Preferably, the recording is produced by means of at least one of optionally multiple microphones of the hearing aid or the other terminal device optionally present (such as the smartphone, etc.).

Especially in the case of the first two variants for initiating the recording (in response to an input by the hearing aid wearer and/or automatically due to a potentially wrong classification), in one advantageous variant of the method recordings are produced continuously, especially sliding over predetermined "sample" or "snippet" periods by means of at least the optionally multiple microphones of the hearing aid (and preferably placed in temporary storage) and only memorized for further use if one of the two aforementioned events for initiating of the recording occurs. This has the advantage that, when the recording is initiated, already a large number of sound impressions (especially noises) possibly resulting in (at least subjective) wrong classification (or no recognition) might no longer be audible. Thus, in such a case, the probability is increased that corresponding noises are contained in the recording when the latter is initiated. In the event that the recording is not initiated, the preceding recordings (especially those temporarily stored) are advisedly discarded, preferably in permanent manner.

In one expedient variant of the method, the characteristic signal for the unknown acoustic situation, i.e., in particular for the above described recording of the real (acoustic) situation, is saved in a central database (such as a database provided by a cloud service) and is fetched from this central database for its presentation in particular to the respective terminal device. This makes it possible, in easy advantageous manner, to present the identical, specifically the same signals, to multiple users.

In another expedient variant of the method, the unknown acoustic situation in response to the indication of the signal source by the user is added to the training data as a known listening situation, in particular specifically as an example of a known listening situation, optionally also as a "newly generated" listening situation.

In order to increase the likelihood of the unknown acoustic situation being a specific listening situation, in one advantageous modification of the above variant of the method the characteristic signal for the unknown listening situation is presented to multiple users (or hearing aid wearers) and the unknown acoustic situation is only added to the training data as a known listening situation (or as an example of such) if a predetermined number of users (or a percentage or a specific number of users who were presented with this signal) have agreed on the indication of this signal as the signal source. Hence, it is advantageous for the "registering" of the unknown acoustic situation as a known listening situation in the training data that not only one but rather multiple hearing aid wearers identify this acoustic situation as the same (in particular, match it with the same signal source).

In one expedient variant of the method, the user or the respective user is presented with multiple acoustic signals from known signal sources and the indications of this user as to the signal source associated with the respective signal, especially in terms of the correctness of his indications, are used to determine a suitability value. In this case, the characteristic signal for the unknown listening situation is preferably only presented to the user if the suitability value determined for this user exceeds a given value. Advantageously, this makes it possible that only users who assign the known acoustic situations with high reliability to the "correct" signal sources make an indication for the unknown acoustic situation. This, in turn, can increase the probability of the most realistic possible matching of the unknown acoustic situation with a signal source (which may also comprise multiple single sources, for example, the noise of an electrical device embedded in outdoor noises or the like).

Preferably, the above described "evaluation" of the particular user in terms of their suitability is determined by means of so-called gamification. In particular, elements are used which are familiar to users from games (especially a kind of reward system), preferably to increase the motivation of the user to participate through various incentives. For example, at first relatively easily recognized acoustic signals are presented to the user, for example as part of a hearing test, a listening training program, or a game (which is provided, e.g., by the hearing aid maker as a software application for a smartphone or a digital assistant of the aforementioned kind for the user, especially the hearing aid wearer), which the user needs to match up with a signal source, especially by making a choice from a presented list of signal sources. At the start of the program, especially on a "beginner level", the "distances" (i.e., the differences in particular) of the signal sources offered in parallel with the "correct" signal source are comparatively large. For example, the noise of a drum is sounded, and besides the drum there are offered a piano, a flute, and a guitar as further possible choices. If the user (of this listening example or a percentage of multiple listening examples) makes the correct choice, the distance of the further possible choices from the correct solution and/or the complexity of the presented signal is increased on respectively "higher levels". For example, for the noise of a marching drum which is sounded there are offered the further possible choices of a kettle drum, a conga drum, and bongo drums. Alternatively to individual instruments—especially on "higher" levels—there may also be presented complex noises, such as traffic noise with various "additions", such as a passing streetcar, an excavator, or different listening situations, for example in a cafe, on a bus, on a street, each of which need to be kept apart. When the user has finished a given number of levels, his suitability value is advisedly increased (for example, depending on his overall percentage of correct answers) and/or ranked as sufficiently high.

Preferably, in addition or optionally alternatively (to the above described required number) an unknown acoustic situation is only added to the training data as a known listening situation (or as an example of such) when a given number of users have agreed on the indication of the signal source of this signal with a suitability value greater than a target value. This target value is optionally higher than the aforementioned given value at which the user is first presented with the characteristic signal for the unknown listening situation. In this way, answers of different users can also be optionally weighted (especially in dependence on their suitability value).

In one expedient variant of the method, the indications of the user or the respective user are taken to the central database described above or to an additional central database and are evaluated by an algorithm implemented on this database, especially in regard to the suitability value. Thus, the determination as to whether the particular user is suitable for the potential identification of the unknown acoustic situation, especially whether his suitability value is ranked high enough, is done in centralized manner. This is especially expedient when the above described program (e.g., the game) is designed as an "online program" (e.g., an "online game"), which is provided by the database with corresponding (initially known) "listening examples".

Alternatively, the suitability value is determined "offline", especially by means of the above described program, for example by incorporating the known listening examples of the program as a package. Then, at a sufficiently high level—optionally after obtaining the consent of the user—the program expediently establishes a connection with the database to retrieve the characteristic signal for an unknown acoustic situation, or at least one such signal—optionally with proposals for signal sources created by the database with the aid of a first classification.

In one expedient variant of the method, the recording or the respective recording of the real situation as described above is associated with meta-data. This meta-data contains information about a listening situation matched up by the classifier, a current position of the hearing aid (determined in particular by a position sensor), a background noise level, optionally a signal/noise ratio derived from this, an estimated value for the distance from a sound source, a manufacturing date of the hearing aid and/or an operation software and additionally or alternatively a number of microphones used for the recording (and optionally their age). Optionally, this meta-data additionally or alternatively comprises information about a noise canceling performed during the recording, an own voice processing, or the like.

In one preferred variant of the method, the recording or the respective recording of the real situation is furthermore standardized as a characteristic signal for the unknown acoustic situation prior to its presentation. This makes possible the highest possible uniformity of different presentations, especially in the event that multiple unknown acoustic situations are to be presented to the user. Expediently, however, the recording or the respective recording is also discarded, i.e., erased in particular, if this recording does not correspond to the given standards or cannot be standardized.

In one expedient further development, during the above described standardization, the recording or the respective recording (snippet) is adjusted to a target format in regard to its length (in time) and/or its data format. For example, in the latter case the recording is optionally changed on the corresponding central database to a data format which can be processed equally by all terminal devices, preferably independently of platform. The length of the respective recording may be, for example, a period of time between 2 and 10 seconds, especially around 3 to 7 seconds.

In another expedient further development, during the above described standardization, a quality value is assigned to the recording or the respective recording (i.e., the snippet) on the basis of the meta-data (such as the derived signal/noise ratio, the estimated value for a distance from a sound source, the length of the recording, a degree of clogging of the microphone or microphones, the age of the microphones, and the like). Preferably only a recording with a sufficiently high quality value is presented to the user or the respective user. For example, in this way it is possible to discard relatively "unusable" or "unrecognizable" recordings already prior to being presented, for example on account of any background noise covering a useful signal, a high degree of clogging of the microphone or microphones, so that little usable information is contained in the recording, or the like. In the above described use of gamification, this can sustain the motivation of the user to continue participating, or maintain it sufficiently high, since the user is not presented with (at least subjectively) unsolvable problems. The assigning of the quality value is done preferably by means of a self-learning algorithm, which is preferably processed on the corresponding central database. Optionally, a selection is done in several steps or "levels" by means of an appropriately adapted or a taught self-learning algorithm by sorting out unusable recordings step by step, each time with the aid of "more sensitive" or more precise algorithms.

In yet another expedient further development of the above described standardization—additionally or alternatively—multiple recordings are compared in regard to their acoustic content and recordings with sufficiently similar acoustic content are grouped together. In other words, multiple groups of recordings which sound the same are preferably formed. In one simple variant, this grouping is done for example with the aid of the original classification by the hearing aid classifier. To enhance the precision, additionally or alternatively pattern recognition methods will be used (preferably on the corresponding database), making possible and preferably also carrying out a comparison of the acoustic content of different recordings.

The aforementioned controller is optionally a central microcontroller. Preferably, however, the controller is formed by a distributed system, such as one or more databases and the terminal device, wherein the indications of the user are evaluated and the training data is composed for the classifier in particular on the corresponding database. The above described software application preferably runs on the terminal device or is at least installed and can run on it.

Preferably, the hearing system (especially as one of several terminal devices) comprises a hearing aid with a signal processor, on which the above described classifier is preferably implemented, especially in the form of a (self-learning and trained) algorithm.

In one alternative embodiment, the hearing system comprises a central classifier, which is designed in particular as a "cloud classifier" and implemented preferably on the aforementioned central database or optionally on another central database. In this case, the hearing aid preferably sends a recording (especially with the meta-data) to the cloud classifier in the above described manner. The recording is analyzed by said classifier—making use of system resources usually more extensive than those of the hearing aid (especially computing power and/or computing memory)—and a classification result is sent back to the hearing aid.

In one variant of the method which is advantageous in terms of data protection, snippets containing speech, especially where spoken words and a person's voice are recognizable, are furthermore discarded or optionally the voice component is also removed.

The conjunction "and/or" is to be understood here and in the following such that features connected by means of this conjunction may be embodied either together or as alternatives to each other.

Other features which are considered as characteristic for the invention are set forth in the appended claims.

Although the invention is illustrated and described herein as embodied in a method for training a listening situation classifier for a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
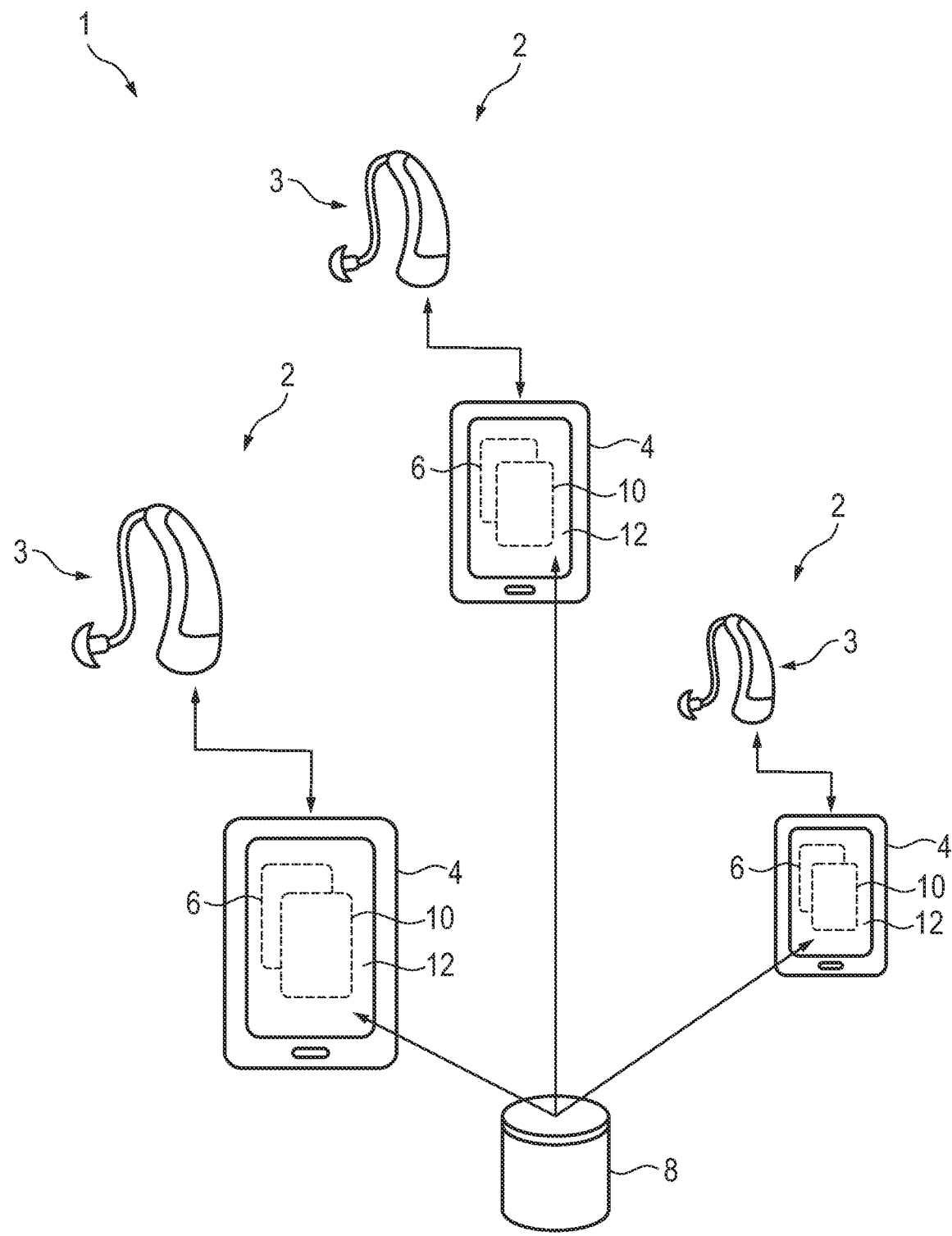
FIG. 1 is an illustration of a hearing system.

Mutually corresponding parts are given the same reference numerals in all the figures.

Referring now to the figures of the drawings in detail and first, particularly to FIG. 1 thereof, there is shown schematically a hearing system 1. The hearing system 1 includes multiple individual subsystems 2, that is, each one associated with a hearing aid wearer (or user, not otherwise represented). Each subsystem 2 contains at least one hearing assist device, referred to as "hearing aid 1" in short, and a mobile device, represented here as a smartphone 4. The respective smartphone 4 forms a terminal device of the respective hearing aid wearer and is adapted for bidirectional communication with the respective hearing aid 3. In normal operation, the respective hearing aid 3 is also connected to its associated smartphone 4.

Furthermore, a control application (in short: "control app" 6) is installed on the respective smartphone 4, by means of which settings can be done for the hearing aid 3—for example, changing the loudness and/or switching the listening programs.

The hearing system 1 furthermore contains at least one central database 8, which is adapted to communicate with the respective smartphone 4 of the respective subsystem 2—especially via the Internet. The database 8 provides information to the respective hearing aid 3, such as updates for firmware and also the control app 6 for download.

In an optional exemplary embodiment, a listening situation classifier (in short: "classifier") is implemented on the database 8, so that a central classification can be done for the subsystems 2 of the hearing system 1. In this case, the hearing aids 3 send data on the current acoustic situations to the database 8 via the smartphones 4. The classifier there analyzes this data and sends back to the smartphone 4 a classification result, specifically a recognized listening situation, i.e., one which is stored in memory and "taught" or trained with the aid of examples—which is associated in turn with a listening program stored on the hearing aid 3. In a simple embodiment, the smartphone 4 relays this listening situation to the hearing aid 3 and the latter switches its signal processing to the recognized listening situation (it changes the listening program, e.g., from a "speech" listening program to a "television" listening program). Alternatively, the database 8 sends multiple possible "program proposals" for the recognized listening situation to the smartphone 4 (such as "one-on-one conversation", "television", "music listening"), so that the respective hearing aid wearer can select a listening program which appears suitable to him. This is then sent to the hearing aid 3.

In an alternative exemplary embodiment, the above described classifier is implemented separately in each hearing aid 3. In this case, the classification of the current acoustic situation is thus done locally (or also "offline", since no connection with the database 8 is required).

For the entertainment of the respective hearing aid wearer, software and especially games applications are also provided by the database, especially games involving listening itself, i.e., they are provided for download. These games are provided and designed especially for listening training through games or hearing tests. In the exemplary embodiment represented, such a games application (in short: games app 10) is installed on each of the smartphones 4 shown. This games app 10 is also provided for the listening training.

For this purpose, recordings are played (i.e., acoustic signals are presented) during the course of the game to the respective hearing aid wearer—in the exemplary embodiment shown, by means of the respective hearing aid 3—which the hearing aid wearer has to identify. For this purpose, solution proposals are also shown to the hearing aid wearer for selection on the display 12 of the corresponding smartphone 4 (specifically, one correct solution and at least one alternative but "wrong" answer). If the hearing aid wearer correctly recognizes the content of the recording (e.g., the noise of a drum), the degree of difficulty is increased in the next "round" or on a higher level (e.g., only after several correct answers). For example, the acoustic content of the recording is more complex (e.g., two instruments) and/or the solution proposals are "easier" to confuse with the correct solution.

Figure 2:
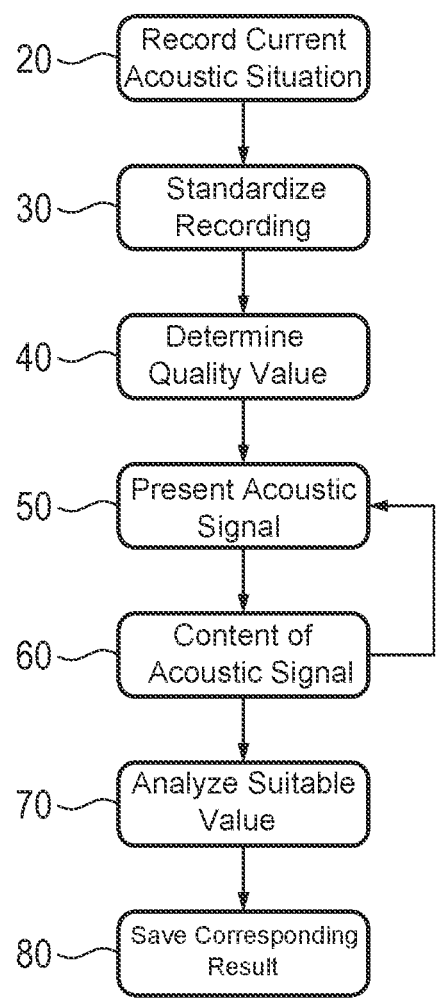
FIG. 2 is a schematic flow chart of a method carried out by the hearing system.

In the event of an unsatisfactory classification of the current acoustic situation for the corresponding hearing aid wearer or if the classifier cannot match up the situation with a memorized listening situation with sufficient probability, a method represented by FIG. 2 is carried out by the hearing system 1 in order to make possible a further learning of such an acoustic situation, hereinafter called an "unknown" situation.

If the hearing aid wearer determines that the listening situation presented by the classifier and the settings connected with the associated listening program do not result in a subjectively satisfactory sound impression, and he therefore changes the hearing aid settings (such as the loudness or the listening program) on the hearing aid 3 itself or in the control app 6, or if the classifier itself indicates a high probability value for a wrong classification (or conversely a probability value for the occurrence of a known listening situation which is below a limit value), a recording of the current acoustic situation is triggered in a first method step 20. In any case, a recording of the current acoustic situation will be saved temporarily by means of at least one microphone of the corresponding hearing aid 3 continuously over sliding time slots. However, if there is no triggering, the recording will be discarded once more. But if triggering occurs, the recording will be saved as a "snippet" throughout the current time slot (i.e., for a period of time prior to the triggering and after the triggering) and sent to the database 8 via the smartphone 3, specifically the control app 6. The particular recording is accompanied by meta-data containing the signal/noise ratio, the age of the hearing aid and the microphone(s), the number of microphones used for the recording, and the result of the classification.

In the database 8, the recording (i.e., the snippet) is standardized in a following method step 30, i.e., it is transformed if necessary into a data format which can be handled by all hearing aids 3 connected to the hearing system 1 and sorted into groups with other recordings by means of the classification relayed with the meta-data. Furthermore, the signal/noise ratio and the age of the microphone(s) are used to determine a quality value. If this quality value falls below a given value (e.g., because of no useful signal component or one which can hardly be determined), the recording is discarded from the database.

If the quality value is sufficiently high, the recording is provided as an acoustic signal for retrieval by the games app 10 in a further method step 40.

If a hearing aid wearer plays the games app 10 on his smartphone 4, at first, he is presented with an acoustic signal for a known acoustic situation in the manner described above (method step 50) and then, in a method step 60, he is asked to indicate the content of the acoustic signal (i.e., the recording presented). Under increasing degree of difficulty as described above, the method steps 50 and 60 are repeated during the games app 10. As the game proceeds, the games app 10 (or also the database 8) will increase a suitability value of this hearing aid wearer. If this suitability value is sufficiently high (for example, the number of correct answers is at or over 85 percent), the hearing aid wearer will be offered a "special level" in a method step 70, during which the hearing aid wearer has a chance to participate actively in the training of the classifiers.

If the hearing aid wearer accepts this offer, he will have at least one of the recordings of the unknown acoustic situations played to him. Optionally, the hearing aid wearer will be offered a free data entry mask for his appraisal of the acoustic situation or also possible answers. The answer of the hearing aid wearer will be saved in the database 8.

If a sufficiently high number, specifically, a given number of hearing aid wearers (such as 100, 500, 1000 or more) achieve a correspondingly high suitability value and then provide an answer for the same unknown acoustic situation, these answers for the respective unknown acoustic situation will be compared by the database. If a percentage or an absolute number of the same answers exceeds a given value, the database will save the corresponding recording in a method step 80 as a known acoustic situation for a listening situation formed together with the answers or assign the recording to an already existing listening situation as a further training example based on the consistent answers. Thus, the training data for the classifiers is updated by means of real situations. Such newly determined training examples or new listening situations (in the latter case, after first creating an associated listening program, preferably by corresponding developers) are then used for the training of the classifiers with the updated (adapted) training data. For already trained classifiers, the updated training data will be used during an update.

The subject matter of the invention is not limited to the exemplary embodiments described above. Instead, further embodiments of the invention can be deduced by the person skilled in the art from the preceding specification.

LIST OF REFERENCE NUMERALS

1 Hearing system
2 Subsystem
3 Hearing aid
4 Smartphone
6 Control app
8 Database
10 Games app
12 Display
20 Method step
30 Method step
40 Method step
50 Method step
60 Method step
70 Method step
80 Method step

The invention claimed is:

1. A method for a training of a listening situation classifier for a hearing aid, which comprises the steps of:
   presenting a user with a plurality of acoustic signals by means of a terminal device;
   prompting the user to indicate a signal source of a signal or a particular presented signal;
   adapting training data for the listening situation classifier in dependence on a user's indication of the particular presented signal or one of several signals presented; and
   updating the listening situation classifier by means of the training data.

2. The method according to claim 1, wherein the particular presented signal or one of the several signals presented forms a characteristic signal for an unknown acoustic situation not known to the listening situation classifier.

3. The method according to claim 2, wherein the characteristic signal for the unknown acoustic situation contains a recording of a real situation.

4. The method according to claim 3, wherein the recording of the real situation is produced when a hearing aid wearer provides a characteristic input for a setting produced in an unsatisfactory manner by the listening situation classifier and/or when the listening situation classifier can only match up the real situation with a trained listening situation by a probability value falling below a limit value.

5. The method according to claim 2, wherein the characteristic signal for the unknown acoustic situation is saved in a central database and is fetched from the central database for its presentation.

6. The method according to claim 2, wherein the unknown acoustic situation in response to an indication of the signal source is added to the training data as a known listening situation.

7. The method according to claim 6, wherein the characteristic signal for the unknown acoustic situation is presented to a number of users and the unknown acoustic situation is only added to the training data as the known listening situation if a predetermined number of the users have agreed on the indication of the characteristic signal as the signal source.

8. The method according to claim 2, wherein the plurality of acoustic signals from known signal sources are presented to the user or a respective user and an indication of the user as to the signal source matched up with a respective signal is used to determine a suitability value, and the characteristic signal for the unknown acoustic situation is only presented to the user if the suitability value determined for the user exceeds a given value.

9. The method according to claim 1, wherein indications of the user or a respective user are supplied to a central database or an additional central database and are evaluated by an algorithm implemented on the central database or the additional central database in regard to a suitability value of the user or the respective user.

10. The method according to claim 3, wherein the recording or a respective recording of the real situation is associated with meta-data containing information about a listening situation matched up by the listening situation classifier, a current position of the hearing aid, a background noise level, an estimated value for a distance from a sound source, a manufacturing date of the hearing aid and/or operation software and/or a number of microphones used for the recording.

11. The method according to claim 10, wherein the recording or a respective recording of the real situation is standardized as the characteristic signal for an unknown listening situation prior to a presentation.

12. The method according to claim 11, wherein during a standardization, the recording or the respective recording is adjusted to a target format in regard to its length and/or its data format.

13. The method according to claim 12, wherein during the standardization a quality value is assigned to the recording or the respective recording on the basis of the meta-data, and wherein only a recording with a sufficiently high quality value is presented to the user or the respective user.

14. The method according to claim 11, wherein multiple recordings are compared in regard to their acoustic content and recordings with sufficiently similar acoustic content are grouped together.

15. A hearing system, comprising:
   at least one terminal device;
   a listening situation classifier; and
   a controller configured to perform a method for a training of a listening situation classifier for the hearing system, said controller programmed to:
      present a user with a plurality of acoustic signals by means of said at least one terminal device;
      prompt the user to indicate a signal source of a signal or a particular presented signal;
      adapt training data for the listening situation classifier in dependence on a user's indication of the particular presented signal or one of several signals presented; and
      update the listening situation classifier by means of the training data.

16. The hearing system according to claim 15, further comprising a hearing aid with a signal processor, on which the listening situation classifier is implemented.

* * * * *